1/27/87 OR 4,639,570

United States Patent [19]

Zverina et al.

[11] Patent Number: 4,639,570

[45] Date of Patent: Jan. 27, 1987

[54] APPARATUS FOR STABILIZATION OF LOW-TEMPERATURE PLASMA OF AN ARC BURNER

[76] Inventors: Karel Zverina, No. 4 U kola, Praha 4; Denek Tluchor, No. 4 Drevna, Praha 2; Josef Szabo, No. 4 Ripska, Praha 10; Jaromir Polidor, No. 43 Ovenecka, Praha 7; Petr Kroupa, No. 540 Fertekova, Praha 8, all of Czechoslovakia

[21] Appl. No.: 699,654

[22] Filed: Feb. 8, 1985

Related U.S. Application Data

[62] Division of Ser. No. 466,648, Feb. 15, 1983, Pat. No. 4,531,043.

[30] Foreign Application Priority Data

Feb. 15, 1982 [CS] Czechoslovakia .................... 1023-82
Feb. 15, 1982 [CS] Czechoslovakia .................... 1024-82

[51] Int. Cl.[4] ............................................... B23K 15/00

[52] U.S. Cl. ...................... 219/121 PP; 219/121 PN; 219/121 PQ; 219/75; 313/231.51

[58] Field of Search .................. 219/121 PP, 121 PM, 219/121 PQ, 121 PN, 75, 76.16; 313/231.31-231.51; 315/111.21; 204/298, 164

[56] References Cited

U.S. PATENT DOCUMENTS

| | | | |
|---|---|---|---|
| 3,641,308 | 2/1978 | Couch, Jr. et al. | 219/121 PN |
| 3,658,673 | 4/1972 | Kugler et al. | 204/164 |
| 3,665,244 | 5/1972 | Kugler | 315/111 |
| 3,712,996 | 1/1973 | Kugler | 313/231 |
| 4,311,897 | 1/1982 | Yerushalmy | 219/121 PP |
| 4,338,509 | 7/1982 | Bartuska et al. | 219/121 PP |

*Primary Examiner*—M. H. Paschall
*Attorney, Agent, or Firm*—Jeffers, Irish & Hoffman

[57] ABSTRACT

Method of and apparatus for stabilizing a plasma stream by the use of two different stabilization liquids. The plasma arc is stabilized in the discharge chamber by a whirl of a first stabilization liquid containing at least one element chosen from the group consisting of carbon and nitrogen, and the plasma arc is stabilized in the stabilization channel by a second stabilization liquid differing in its boiling point from the first stabilization liquid. Between the discharge chamber of the burner and the stabilization channel there is provided a transition space from which there lead slit-like outlets for the stabilization liquids. In the transition space there may be placed an orifice plate dividing said space into two sub-spaces. From the stabilization channel upstream of the front nozzle of the burner there may be provided an outlet for the second stabilization liquid, which is disposed in the stabilization channel. In accordance with the invention the stabilization system of the plasma burner of torque is divided into two comparatively independent circuits.

1 Claim, 2 Drawing Figures

APPARATUS FOR STABILIZATION OF LOW-TEMPERATURE PLASMA OF AN ARC BURNER

This is a division of application Ser. No. 466,648, filed Feb. 15, 1983, now U.S. Pat. No. 4,531,043.

This invention relates to a method of and an apparatus for the stabilization of a low-temerpature plasma in an arc burner.

In known liquid stabilized low-temperature plasma forming arc burners, an arc burns in a channel between the cathode and the anode of the burner, the arc being surrounded by a whilring injected arc-stabilizing liquid.

Known methods for stabilizing low-temperature plasma arcs use one stabilization liquid of the protection of the material which surrounds the channel from the thermal effects of the electric arc and of the plasma thus formed, for the protection of the cathode material against oxidation, and also for forming (shaping) the plasma itself. One such known method uses ionized water which is introduced into the stabilization system through suitably disposed tangential inlets provided in the neighborhood of the cathode, as well as between individual orifice plates of the stabilization system. The ionized water is drained through slit-like outlets arranged in such a way that a whirl is formed in the stabilization system. The electric arc burns through said whirl, which is thick enough to ensure the plasma formation (shaping), as well as to cool the stabilization system. The use of water as the only stabilizing liquid for ensuring all of the above described required functions is thus a kind of compromise; on the one hand it simplifies the design and the operation of the plasma generator, but on the other hand it limits the possibility of reaching high plasma temperatures, it increases the wear of the cathode, and limits, by influencing the reductive nature of the recombined plasma, the applicability of the generator except for some sorts of plasma sprays, particularly for use in the field of oxide ceramics.

It is known (DE OS No. 20 28 193) to arrange the arc burner as a compact whole which is, in principle, formed by a cathode and its surrounding accessories, and by a system of nozzles and intermediate rings, one inlet and two outlets for the single stabilization liquid being provided to secure the circulation of such liquid. The design of the burner is such that it is possible only to use a single stabilization liquid therewith.

The present invention has among its objects the provision of a method of and an apparatus for stabilizing a plasma arc which decreases the shortcomings and limitations of the prior art (in its use of one stabilization liquid in the arc burner), and to permit the burner to be used in the application of a broader spectrum of coating materials than was heretofore possible.

The shortcomings of known methods for the stabilization of low-temperature plasma in a liquid stabilized arc burner are overcome by the present method of and apparatus for the stabilization of a low-temperature plasma. In accordance with the invention, the plasma arc is stabilized by two liquids, the first of which stabilizes the arc in the burner discharge chamber, such first stabilizing liquid containing an element or elements of the group consisting of carbon and nitrogen, while the second stabilizing liquid, which has a different boiling point from that of the first stabilizing liquid, stabilizes the arc in the stabilization chamber of the burner. It is advantageous when first stabilization liquid, which is introduced into the discharge chamber of the burner, possesses a lower boiling point than the second stabilization liquid, and when the boiling point of such first liquid is higher than that of water.

The disadvantages of known arc burners are overcome by the arc burner of the present invention. Such burner contains a discharge chamber disposed around a rod cathode, a stabilization channel formed by a system of nozzles and rings, as well as a rotary external anode, and circuits for the circulation of a first stabilization liquid. A transition space is provided between the discharge chamber and the stabilization channel of the burner. In such transition space there is provided a slit-like outlet for at least one of the stabilization liquids. Tangential inlets for the first stabilization liquid leading into the discharge chamber are provided, as well as tangential inlets for the second stabilization liquid leading into the stabilization channel. Such inlets are connected to delivery pipes for the individual stabilization liquids. An orifice plate is advantageously disposed in such transition space.

An advantageous combination of two or even more kinds of stabilization liquids for a liquid stabilized plasma arc burner makes possible a considerable improvement of its operating parameters in several respects. In the burner discharge chamber, i.e. in the cathodic part of the stabilization system, the use of a carbon-containing stabilization liquid results in the suppression of an undesired dwindling or erosion of a carbon cathode due to its surface oxidation. By using stabilization liquids with an increased content of chemically bound carbon and an increased content of chemically bound nitrogen the undesired effects of a stabilization media which are employed are considerably reduced, whereby the use of metallic electrodes such as those made of tungsten or thorium is made possible; the use of such electrodes in existing liquid stabilized plasma arc burners was hitherto practically excluded. Furthermore, the utilization of liquids having higher boiling points than water makes it possible to increase the output parameters of the burner, particularly the temperature of the recombined plasma. By "boiling point" is meant the temperature at which there is present the energy necessary to cause boiling or vaporization of the stabilizing liquid.

By a suitable combination of stabilization liquids, wherein the first liquid, which is introduced into the discharge chamber, is chosen from the standpoint of the starting ability of the arc burner, and the second liquid, which is introduced into the stabilization channel, is selected regarding its influence on the temperature of the generated plasma, the undesired effect of either the oxidative or reductive nature of the recombined plasma is simultaneously suppressed. The cathode service time which is attained, as well as the increase of the output and qualitative parameters of the arc burner and of the generated plasma, result in broader possibilities of use of liquid stabilized plasma arc burners.

The design of the plasma arc burner of the invention makes possible the use of two or more stabilization liquids, and therefore lower cathode oxidation with an improvement of heat take-off, and simultaneously makes possible the improvement of the starting ability of the plasma generator, the temperature of the recombined plasma being raised.

The arrangement of the outlet or outlets of the stabilization liquids makes possible a choice of the streaming of the liquids in such a way that in the discharge chamber the liquid streams from the cathode toward the anode, resulting in an increase of arc stability, and in the stabilization channel the liquid streams in a direction from the anode toward the cathode, resulting in an increase of the generator output.

BRIEF DESCRIPTION OF THE DRAWINGS

Preferred examples of the arrangement of liquid stabilized plasma burners according to the invention are shown in the accompanying drawings, in which.

Figure 1:
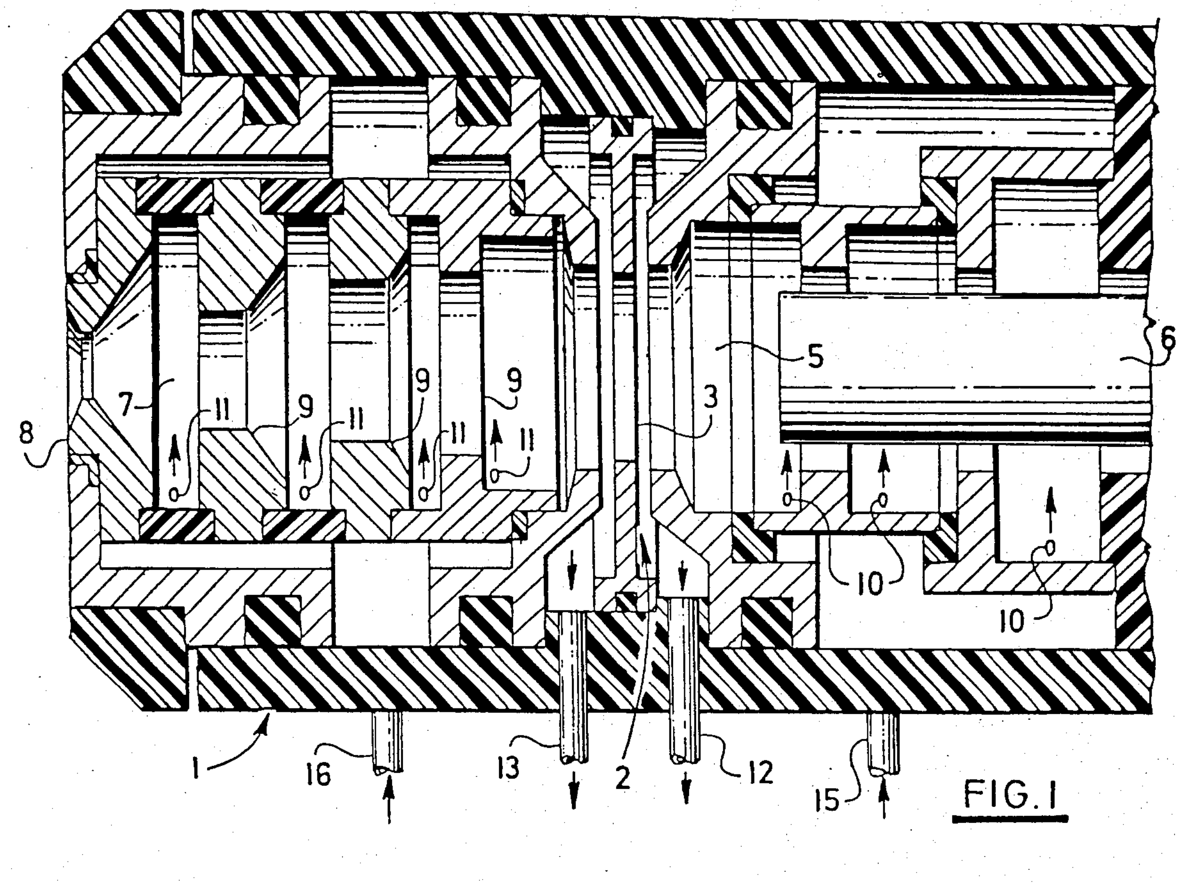
FIG. 1 is a view partially in longitudinal axial section and partially in side elevation of a first embodiment of arc burner, such burner being provided with a transition space and a orifice plate.

In the first illustrative embodiment, shown in FIG. 1, the arc burner contains a transition space 2 with an orifice plate 3, the transition space dividing the burner into a stabilization channel 7 and a discharge chamber 5, chamber 5 surrounding a rod-like cathode 6. In the mouth of the stabilization channel 7 there is provided a nozzle 8, and inside channel 7 there are provided a plurality (3 shown) of orifice plates 9. A plurality of tangential inlets 10 lead into the discharge chamber 5 to feed a first stabilization liquid thereinto. A plurality of tangential inlets 11 lead a second stabilization liquid into the stabilization channel 7, inlets 10 and 11 being attached to separate delivery pipings for the respective stabilization liquids. Thus, a delivery piping 15 is provided for the first stabilization liquid which stabilizes the discharge chamber 5, while a delivery piping 16 feeds a second stabilization liquid into the stabilization channel 7. The arc burner 1 of FIG. 1 has an outlet 12 from the discharge chamber 5 and an outlet 13 from the stabilization channel 7, such outlets being disposed on opposite sides of the orifice plate 3. It is to be noted that the direction of flow of the first stabilization liquid in chamber 5 is from the right to the left, and the direction flow of the second stabilization liquid in stabilization channel 7 is in the direction from left to right.

Figure 2:
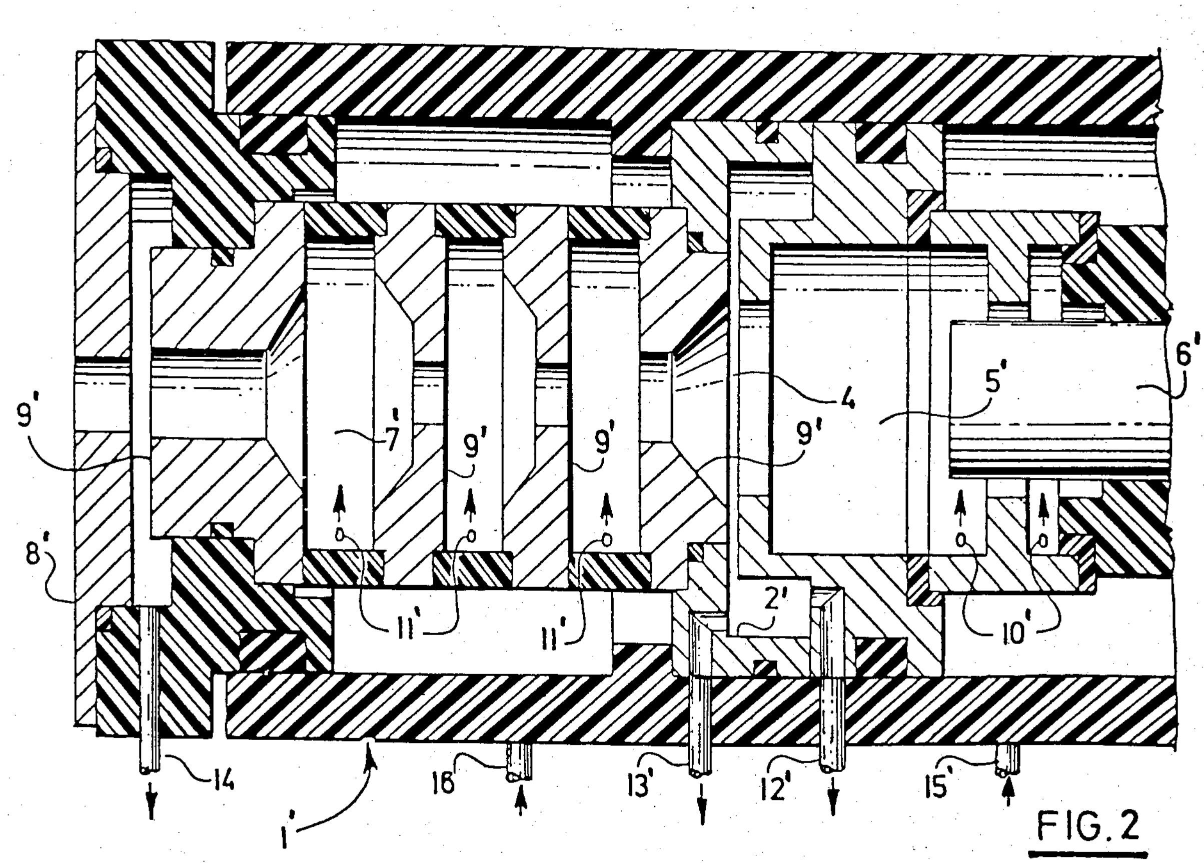
FIG. 2 is a view similar to FIG. 1 of a second embodiment of arc burner in accordance with the invention, such embodiment employing an empty transition space.

In FIG. 2 there is shown an arc burner 1', parts in the embodiment of FIG. 2 which are similar to those in FIG. 1 are designated by the same reference characters as in FIG. 1 but with an added prime. The burner 1' has a transition space designated 4. The outlet 12' and the other outlet 13', from the discharge chamber 5' and the stabilization channel 7', respectively, are arranged on opposite sides of the slit 4' at different distances from the axis of the arc burner 1' according to the physical properties of the stabilization liquids which are used. The burner 1' is provided with an auxiliary outlet 14 for the second stabilization liquid, outlet 14 being disposed immediately inwardly of the nozzle 8'. The auxiliary outlet 14 reduces the losses of the second stabilization liquid.

In accordance with the invention the first stabilization liquid, which is introduced into discharge chamber 5, has a percentage weight of bound carbon ranging from 25 to 93%, and a percentage weight of bound nitrogen ranging from 20 to 25%. The second stabilization liquid, which is introduced into the stabilization channel 7 has a weight percentage of bound carbon ranging from 25 to 80%, and a weight percent of bound nitrogren ranging from 10 to 25%.

The method according to the invention is further illustrated by the following examples:

EXAMPLE 1

In an arc burner according to FIG. 1, provided with a graphite cathode, styrene was introduced as the first stabilization liquid into the cathodic part or discharge chamber 5 of the stabilization system. Water was introduced into the stabilization channel 7. Styrene possesses a boiling point of 145 degrees C., and is insoluble in water. The parts of the two liquids which were not discharged through the outlets 12 and 13 streamed together in a direction from right to left, that is, in a direction from the cathode 6 outwardly through the nozzle 8 and toward the anode (not shown) without being mixed together. The use of such two stabilization liquids considerably increases the service time of the cathode 6, and simultaneously intensifies the plasma stream.

EXAMPLE 2

The burner 1 according to FIG. 1 was employed in this instance. In this example the first stabilization liquid introduced into the discharge chamber 5 was nitrobenzene, whereas the liquid led into the stabilization channel 7 was water. Nitrobenzene is insoluble in water. The parts of such two stabilization liquids which remained after discharge of portions thereof through the outlets 12 and 13, flowed together in a direction from the cathode toward and out of the nozzle 8 in the direction toward the rotating anode (not shown). The combination of stabilization liquids employed in Example 2 produced effects which were similar to those obtained when employing the above-described styrene and water, employed in Example 1.

EXAMPLE 3

A plasma arc burner according to burner 1' in FIG. 2, provided with a tungsten-thorium cathode, was employed in this example. Into the cathodic part of the stabilization system, the discharge chamber 5', there was introduced toluidine, as the first stabilization liquid. Into the stabilization channel 7' there was introduced, as the second stabilization liquid, toluene. Toluidine, which has a boiling point of 201 degrees C., is soluble in toluene, which has a boiling point of 111 degrees C. By directing the stream of a toluidine from the cathode toward the anode, that is, in a direction from right to left, and directing the toluene in the opposite direction, the arc stability was improved, and the number of recombined particles of the plasma spray was increased.

EXAMPLE 4

An arc burner 1' according to FIG. 2, provided with a graphite cathode, was employed in this example. Into the cathodic part of the stabilization system, that is, the discharge chamber 5', there was led a first stabilization liquid in the form of ethyl alcohol. Into the stabilization channel 7' there was led a second stabilization liquid in the form of picoline. Ethyl alcohol, which has a boiling point of 78 degrees C., is soluble in picoline, which has a boiling point of 144 degrees C. This combination of the two stabilization liquids considerably improved the starting ability of the plasma generator.

During the testing of the invention, other kinds of stabilization liquids, e.g. methyl alcohol, ethyl nitrate, and others proved to be satisfactory. All of the mentioned combinations of stabilization liquids produced an increased length of life of cathode by 30 to 35%, and at the same time raised the temperature of the recombined plasma by 20%.

Styrene, employed in Example 1, ($C_6$, $H_5$ CH:CH2) has a bound carbon weight percent of 92.18. Nitrobenzene, employed in Example 2, ($C_6H_5NO_2$) has a chemically bound weight of carbon of 58.48. Toluidine, ($CH_3C_6H_4NH_2$) has a weight percentage of chemically bound carbon of 78.39, and a chemically bound weight of nitrogen of 13.06. Toluene ($C_6H_5CH_3$) has a weight percentage of chemically bound carbon of 91.17.

Ethyl alcohol, employed in Example 4, ($C_2H_5OH$) has a weight percentage of chemically bound carbon of 52.09, where picoline ($CH_3C_5H_4N$) has a weight percentage of chemically bound carbon of 77.31, and a weight percentage of chemically bound nitrogen of 15.03.

It is to be noted that all of the organic liquids disclosed herein as being used for stabilization liquids in accordance with the invention have bond energies greater than that of water. Such bond energies, which depend upon the quantity of chemical bonds, is a measure of the amount of energy required for the transition of molecules of liquid into a fourth state of mass, i.e., into a plasma.

In the present invention, typical bond energies are:

for water ($H_2O$)—221,711 KCal/Mol for ethyl alcohol ($CH_3CH_2OH$)—675.3 KCal/Mol for vinyl benezene ($C_6H_5CHCH_2$)—1,332.8 KCal/-Mol for toludine ($C_6H_4CH_3NH_2$)—1,361.5 KCal/Mol Although the invention is illustrated and described with reference to a plurality of preferred embodiment thereof, it is to be expressly understood that it is no way limited to the disclosure of such a plurality of preferred embodiments, but is capable of various modifications within the scope of the appended claims.

We claim:

1. In a liquid stabilized plasma burner containing a discharge chamber which surrounds a rod-like cathode, a front nozzle, and a stabilization channel disposed between said discharge chamber and nozzle, the improvement wherein between the discharge chamber and the stabilization channel there is disposed a transition space, said transition space separating said discharge chamber and said stabilization channel, said discharge chamber having disposed therein at least one tangential inlet for a first stabilization liquid which is adapted to be introduced into said discharge chamber, and said stabilization channel having disposed therein at least one tangential inlet for a second stabilization liquid which is adapted to be introduced into said stabilization channel, and said transition space having arranged therein at least one outlet for the stabilization liquids, first conduit means externally connected to said burner for supplying a first stabilization liquid to the tangential inlet of said discharge chamber, second conduit means externally connected to said burner for supplying a second stabilization liquid to the tangential inlet of said stabilization channel, said first and second conduits being independent of each other, and an orifice plate arranged between the discharge chamber and stabilization channel, said orifice plate forming two circumferential slot outlets on respective opposite sides of said orifice plate, the first and second stabilization liquids flowing in opposite axial directions.

* * * * *